(12) United States Patent
Royce et al.

(10) Patent No.: US 9,561,459 B2
(45) Date of Patent: Feb. 7, 2017

(54) METHOD AND APPARATUS FOR CLEANING A FILTER

(71) Applicants: John Royce, London (GB); John Cannon, London (GB)

(72) Inventors: John Royce, London (GB); John Cannon, London (GB); Roger Turner, Essex (GB)

(*) Notice: Subject to any disclaimer, the term of this patent is extended or adjusted under 35 U.S.C. 154(b) by 266 days.

(21) Appl. No.: 14/350,261

(22) PCT Filed: Oct. 3, 2012

(86) PCT No.: PCT/GB2012/052448
§ 371 (c)(1),
(2) Date: Apr. 7, 2014

(87) PCT Pub. No.: WO2013/050759
PCT Pub. Date: Apr. 11, 2013

(65) Prior Publication Data
US 2014/0251387 A1    Sep. 11, 2014

(30) Foreign Application Priority Data
Oct. 5, 2011    (GB) .................................. 1117169.1

(51) Int. Cl.
*B08B 5/02* (2006.01)
*B08B 5/04* (2006.01)
(Continued)

(52) U.S. Cl.
CPC ........... *B01D 46/0067* (2013.01); *B01D 41/04* (2013.01); *B01D 46/0073* (2013.01);
(Continued)

(58) Field of Classification Search
CPC ................ B08B 5/00; B08B 5/02; B08B 9/00; B01D 46/0067; B01D 46/0073; B01D 46/0075; B01D 46/521; B01D 41/04; B01D 2279/60
(Continued)

(56) References Cited

U.S. PATENT DOCUMENTS

| 2,156,594 A | 5/1938 | Charles |
| 3,888,694 A | 6/1975 | McKinney |

(Continued)

FOREIGN PATENT DOCUMENTS

| AU | 2011100691 A4 | 7/2011 |
| CH | 598853 A5 | 5/1978 |

(Continued)

OTHER PUBLICATIONS

EPO International Search Report and Written Opinion, dated Feb. 21, 2013, for International Application No. PCT/GB2012/052448.

(Continued)

*Primary Examiner* — Saeed T Chaudhry
(74) *Attorney, Agent, or Firm* — Conley Rose, P.C.

(57) ABSTRACT

A filter cleaning device includes a cleaning chamber operable to receive a gas filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement operable, in one mode of operation, to generate a linear oscillation along an axis of the filter when inserted and, in another mode of operation, to rotate the filter about an axis of rotation.

18 Claims, 8 Drawing Sheets

(51) Int. Cl.
*B01D 46/04* (2006.01)
*B01D 46/00* (2006.01)
*B01D 41/04* (2006.01)
*B01D 46/52* (2006.01)

(52) U.S. Cl.
CPC ........ *B01D 46/0075* (2013.01); *B01D 46/521* (2013.01); *B01D 2279/60* (2013.01)

(58) Field of Classification Search
USPC .................................... 134/33, 32; 15/311
See application file for complete search history.

(56) References Cited

U.S. PATENT DOCUMENTS

| | | | |
|---|---|---|---|
| 4,298,362 A * | 11/1981 | Krull | B01D 46/002 55/304 |
| 4,808,264 A * | 2/1989 | Kignell | C10J 3/485 162/30.1 |
| 4,842,624 A | 6/1989 | Barton | |
| 5,143,529 A * | 9/1992 | Means, Jr. | B08B 5/02 134/22.12 |
| 5,762,783 A | 6/1998 | Harvey | |
| 5,915,439 A * | 6/1999 | Zaiser | B01D 41/04 15/304 |
| 6,755,016 B2 | 6/2004 | Dittler | |
| 2005/0034601 A1 | 2/2005 | Stuckey | |

FOREIGN PATENT DOCUMENTS

| | | | |
|---|---|---|---|
| DE | 19825616 A1 | | 12/1999 |
| ES | 2308943 A1 | | 12/2008 |
| GB | 736535 | * | 9/1955 |
| GB | 736535 A | | 9/1955 |
| GB | 863888 A | | 3/1961 |
| GB | 1539720 A | | 1/1979 |
| GB | 2187655 | * | 9/1987 |
| GB | 2187655 A | | 9/1987 |
| JP | 2000334233 A | | 12/2000 |
| SU | 1099986 A1 | | 6/1984 |
| WO | 9741945 A1 | | 11/1997 |

OTHER PUBLICATIONS

UKIPO Combined Search and Examination Report, dated Feb. 1, 2012, for Application No. GB1117169.1.

* cited by examiner

METHOD AND APPARATUS FOR CLEANING A FILTER

CROSS-REFERENCE TO RELATED APPLICATIONS

This application is a 35 U.S.C. §371 national stage application of PCT/GB2012/052448 filed Oct. 3, 2012 and entitled "Method and Apparatus for Cleaning a Filter," which claims priority to Great Britain Application No. GB 1117169.1 filed Oct. 5, 2011 and entitled "Method and Apparatus for Cleaning a Filter," both of which are incorporated herein by reference in their entirety for all purposes.

BACKGROUND

The present disclosure relates to an air filter cleaner. More particularly, the present disclosure relates to an air filter cleaner comprising both fluid flow and mechanical vibration cleaning mechanisms.

Air filters are used in a number of environments to separate dirt, dust and particulates from an incoming air flow. This is particularly important in fields such as vehicular transportation (e.g. trucks, cars and aircraft) where a clean flow of air into, for example, an internal combustion engine is required in order to ensure continued operation of the engine and prevent contaminants from entering the engine.

Such air filters operate as a particulate barrier. In other words, they are arranged to allow air molecules to pass therethrough whilst preventing the passage of particulates such as dirt and dust. Many air filters thus comprise a filter medium which may take the form of a semi-porous membrane or separation surface. Often, the filter is cylindrical with the membrane forming a pleated cylindrical separation surface.

The filter is placed such that the filter is located a flow path between the air inlet (which may be located on the front of a vehicle) and the inlet to the component to be kept dirt- and dust-free (e.g. the inlet manifold of an IC engine). Thus, dirty airflow enters an air inlet and passes through the filter, depositing dirt and dust thereon. The cleaned airflow then exits the filter and passes downstream thereof.

Since a particulate filter comprises a semi-porous separation surface, over time the pores of the filter will become blocked with separated dirt and dust. This increases the pressure drop across the filter and will, if unchecked, lead to the filter becoming completely blocked and unable to pass an airflow therethrough. Therefore, the filter requires replacement or cleaning In many cases, a used air filter is simply replaced and the old filter thrown away. However, in some situations, it is possible to clean the air filters. Conventionally, this is done with compressed air alone, or compressed air in combination with sonic agitation to shake the dirt and dust free. However, these arrangements are cumbersome and expensive to use. Often, the size and expense of such equipment is prohibitive so it not practical to have on-site cleaning facilities at, for example, truck or bus depots. Instead, it is necessary for a user to send a dirty air filter to a remotely-located cleaning establishment to have the filter cleaned. This has obvious disadvantages in terms of delivery time and cost.

Alternative arrangements are known which employ a combination of high-pressure airflow and mechanical agitation. Examples of known arrangements are disclosed in WO 97/41945, U.S. Pat. No. 6,755,016, GB-A-1,539,720, GB-A-863,888, DE-A-19825616 and U.S. Pat. No. 5,762,783.

However, many of the above arrangements apply direct agitation to the pleats of the filter itself or strike the filter itself with hammers and equivalent striking mechanisms. This can lead to damage to the filter media. Furthermore, many of the above-disclosed arrangements are unsuitable for modern filter elements which comprise a pleated separation surface located within a cage element because they necessarily require unimpeded contact with the filter medium itself.

BRIEF SUMMARY OF THE DISCLOSURE

As a result of the above, there is a need in the art to provide a filter cleaner and method operable to clean an air filter quickly, efficiently and with minimal or no damage to the filter element itself.

According to an aspect of the present disclosure, there is provided a gas filter cleaning device comprising a cleaning chamber operable to receive a filter to be cleaned, the cleaning chamber having an inlet through which a gas flow can be admitted and an outlet for gas flow leaving the cleaning chamber, the inlet and outlet being arranged such that, in use, an airflow is forced to pass through at least a part of the filter when inserted, the filter cleaning device further comprising a mechanical agitation arrangement operable, in one mode of operation, to generate a linear oscillation along an axis of the filter when inserted and, in another mode of operation, to rotate the filter about an axis of rotation.

According to another aspect of the present disclosure, there is provided a filter cleaning device comprising a cleaning chamber operable to receive a gas filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement arranged to contact at least a part of the filter when inserted and operable to generate a linear oscillation of the filter along an axis of the filter when inserted.

By providing such an arrangement, both an airflow and mechanical agitation can be utilised to dislodge accumulated dirt and dust from a filter medium. This enables efficient cleaning of the filter and reduces the time required to perform a cleaning operation.

In one embodiment, the mechanical agitation arrangement is operable, in a first mode of operation, to generate a linear oscillation along an axis of the filter when inserted and, in a second mode of operation, to rotate the filter about an axis of rotation.

In one embodiment, the linear oscillation is generated along the same axis as the axis of rotation about which the filter is rotatable.

In one embodiment, the mechanical agitation arrangement does not rotate in the first mode of operation.

In one embodiment, the mechanical agitation arrangement comprises a receiving surface operable to receive the filter thereon.

In one embodiment, the receiving surface is operable, in the first mode of operation, to oscillate along an axis of the filter and, in a second mode of operation, to rotate about the axis of rotation.

In one embodiment, the receiving surface comprises a plate is located at a base of the cleaning chamber.

In one embodiment, the mechanical agitation arrangement comprises two opposing cam plates, at least one cam plate comprising at least one cam thereon, wherein in the first mode of operation one of the cam plates is operable to rotate with respect to the other of the cam plates.

In one embodiment, in the second mode of operation the cam plates remain stationary with respect to one another.

In one embodiment, each cam plate comprises a plurality of cams.

In one embodiment, each cam plate comprises four cams.

In one embodiment, one of said cam plates is fixedly connected to the receiving surface.

In one embodiment, the mechanical agitation arrangement further comprises an electrical drive motor.

In one embodiment, a clamp arrangement is provided to secure the filter within the cleaning chamber.

In one embodiment, the inlet is formed in the clamp arrangement.

In one embodiment, the filter cleaning device further comprises an openable cover to provide access to the cleaning chamber, the clamp being located on the cover.

In one embodiment, the inlet and the outlet are arranged such that, in use, at least a part of the filter is located in the flow path between the inlet and the outlet.

According to another aspect of the present disclosure, there is provided a gas filter cleaning device comprising a cleaning chamber operable to receive a filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement comprising a receiving surface for receiving the filter and operable to generate a linear oscillation of the receiving surface along an axis of the filter when inserted.

In one embodiment, the gas filter is an air filter.

According to another aspect of the present disclosure, there is provided a method of using the filter cleaning device of any one of the preceding aspects to clean a gas filter.

According to another aspect of the present disclosure, there is provided a method of cleaning a filter, the method comprising: generating longitudinal oscillations to agitate the filter for a first period of time; passing a gas flow through the filter; and rotating the filter for a second period of time.

In one embodiment, steps b) and c) are carried out at the same time.

In one embodiment, said second period of time is greater than said first period of time.

In one embodiment, in step a) the filter is not rotated.

According to another aspect of the present disclosure, there is provided a method of cleaning a gas filter using a filter cleaning device comprising a cleaning chamber operable to receive a gas filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement arranged to contact at least a part of the filter when inserted and the method comprising: a) generating a linear oscillation of the filter along an axis of the filter when inserted to agitate the filter for a first period of time; b) passing a gas flow through the filter; and c) rotating the filter for a second period of time.

BRIEF DESCRIPTION OF THE DRAWINGS

Embodiments of the present disclosure will now be described in detail with reference to the accompanying drawings, in which.

DETAILED DESCRIPTION

Figure 1:
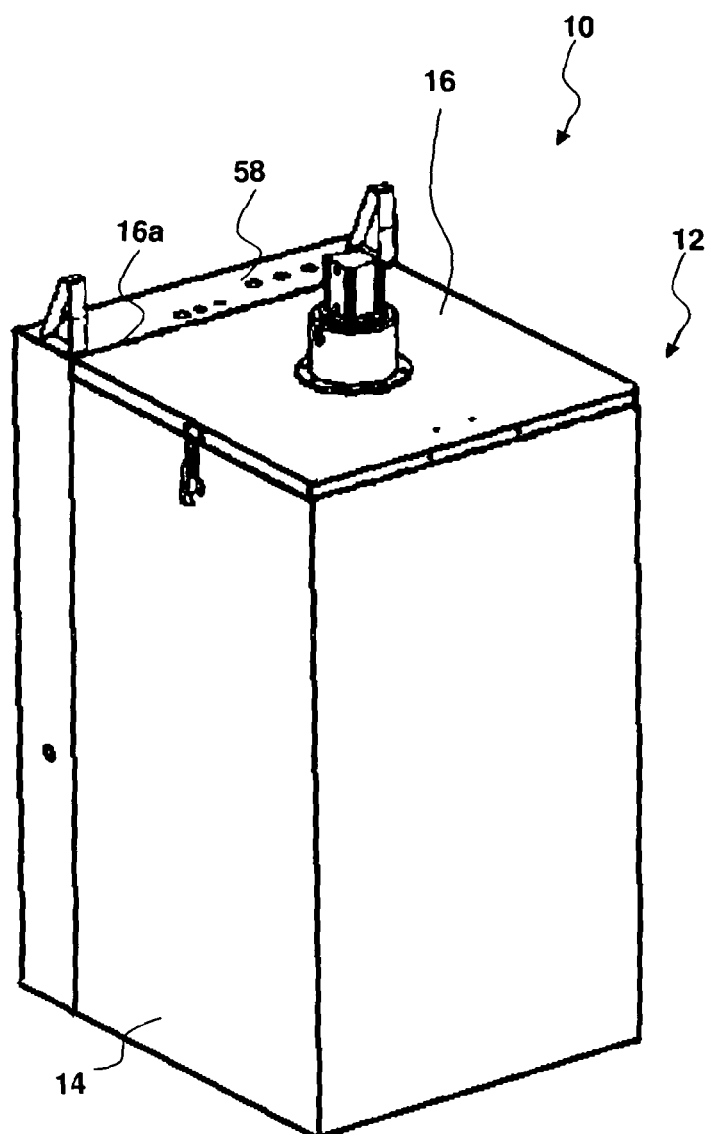
FIG. 1 is a perspective view showing the general configuration of the air filter cleaner according to an embodiment of the present disclosure.
Figure 2:
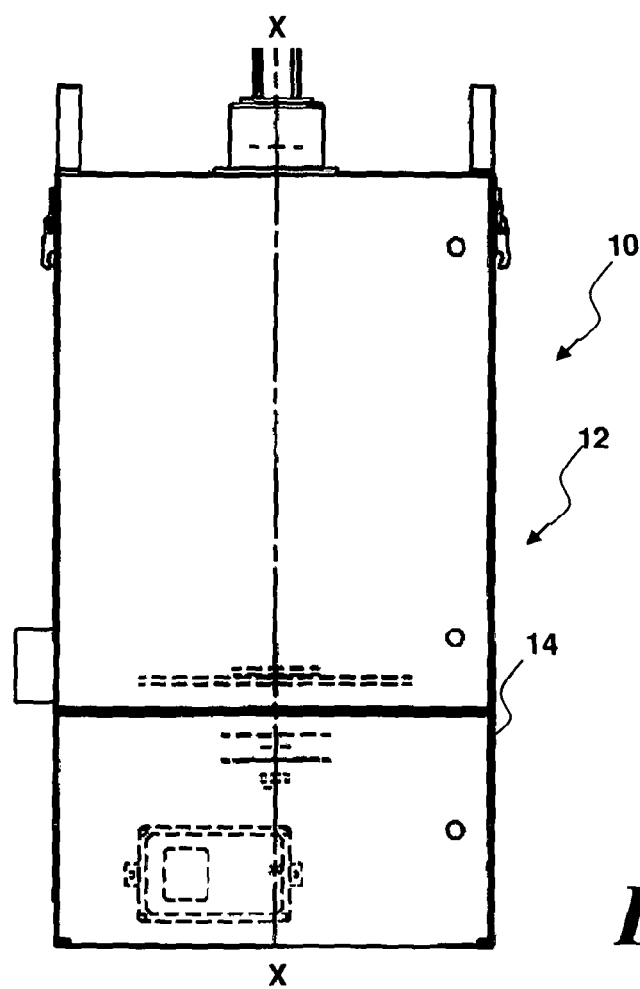
FIG. 2 is a side view of the filter cleaning device of FIG. 1.
Figure 3:
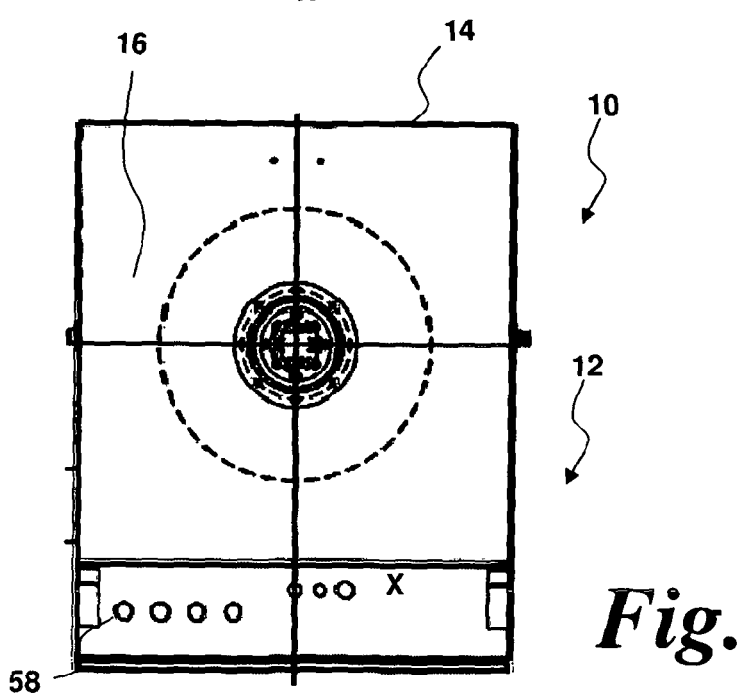
FIG. 3 is a plan view of the filter cleaning device of FIG. 1.

The general configuration of a filter cleaning device according to an embodiment of the present disclosure will now be described with reference to FIGS. 1 to 3. FIG. 1 shows a perspective view of a filter cleaning device 10. FIGS. 2 and 3 show orthogonal views of the filter cleaning device 10.

The filter cleaning device 10 comprises a substantially rectangular body 12 including an outer casing 14 formed from a suitable material such as aluminium or steel. An openable cover 16 is pivotably connected to the outer casing 14 at an upper end thereof and is connected to the outer casing 14 by means of hinges 16a. The cover 16 is openable to provide access to the interior of the filter cleaning device 10 for the insertion of filters for cleaning and removal of filters once cleaned.

Figure 4:
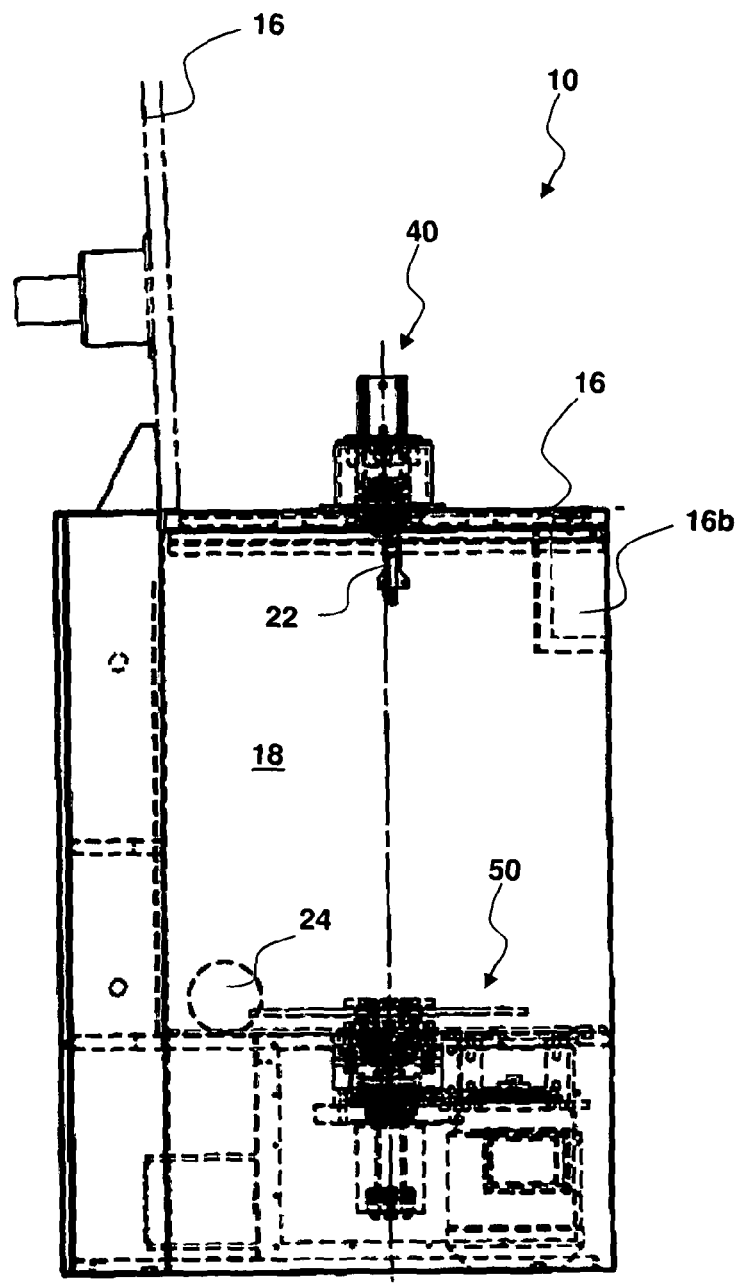
FIG. 4 is a side schematic diagram showing the general internal configuration of the filter cleaning device of FIG. 1.
Figure 5:
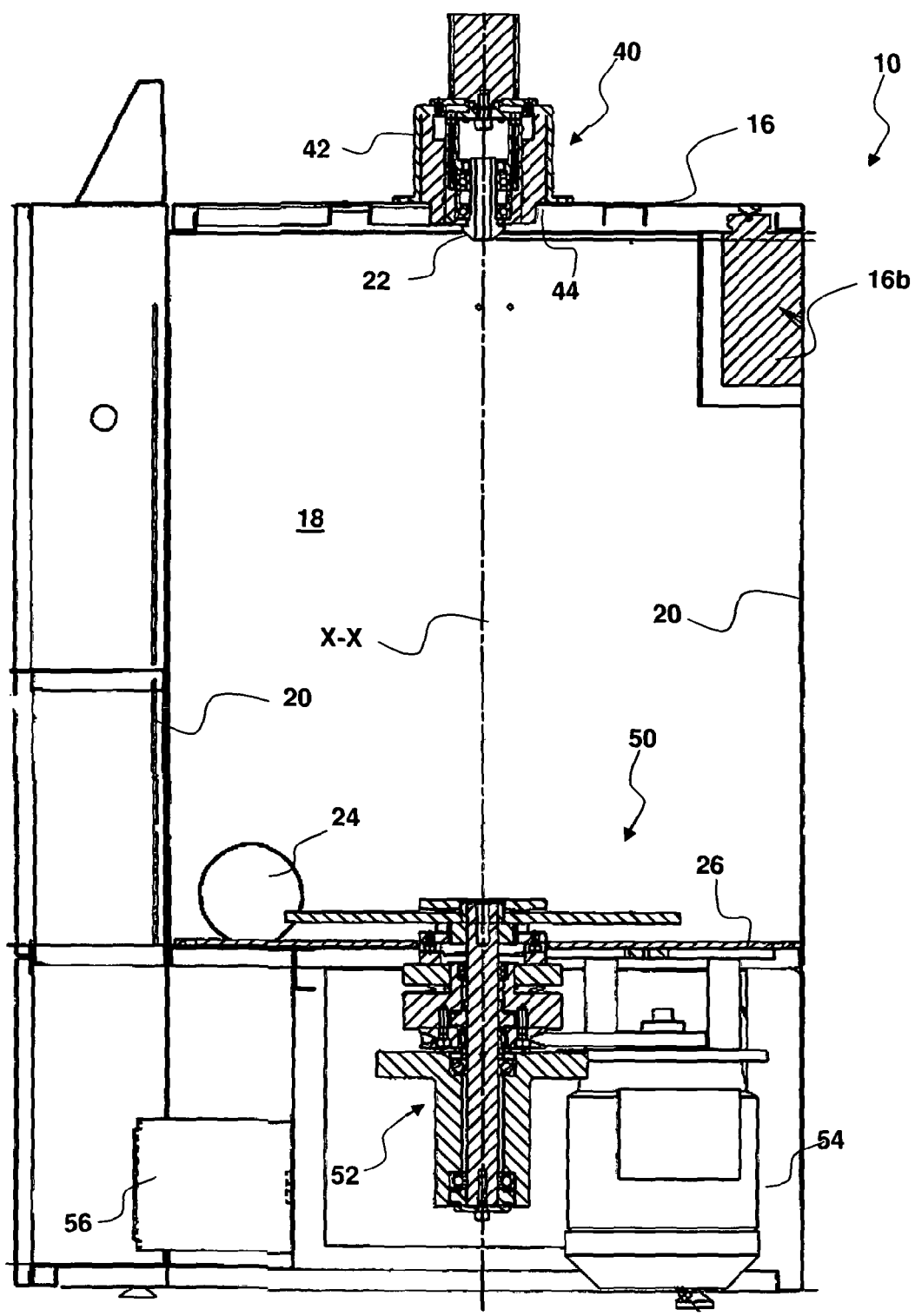
FIG. 5 is a more detailed side schematic diagram showing the general internal configuration of the filter cleaning device of FIG. 1.

FIGS. 4 and 5 show section views through the filter device 10. In FIG. 4, the cover 16 is shown both in a closed position and in an open position. In FIG. 5, the cover 16 is shown in the closed, in use, position.

The cover 16 comprises an automatic locking mechanism 16b in the form of a locking switch. This switch 16b may be mechanically or electronically actuated—for example, a solenoid may be used which is activated once a cleaning cycle is initiated. However, any suitable form of interlock to prevent the cover 16 from being opened in use may be used; the skilled person would readily be aware of the types of interlock which would be suitable for use.

The filter cleaning device 10 comprises an internal cleaning chamber 18. The cleaning chamber 18 is accessible through the open cover 16. The cleaning chamber 18 is delimited by internal walls 20 and is dimensioned and arranged to receive a filter for cleaning therein. When the cover 16 is closed, the cleaning chamber 18 forms an enclosed space. The filter cleaning device 10 is operable to clean a filter by means of both pressurised fluid (in this case, air) and mechanical agitation.

In order to enable a flow of pressurised air through the cleaning chamber 18, an inlet port 22 and an outlet port 24 are provided. The inlet port 22 is formed at an upper end of the cleaning chamber and comprises a fluid conduit extending through the cover 16 and, in use, along the axis of the filter to be inserted. The inlet port 22 is, in use, connected to a supply of compressed air (not shown). The outlet port 24 is formed in a lower side wall of the cleaning chamber 18 adjacent a base 26 of the cleaning chamber 18. The inlet port 22 and outlet port are arranged such that walls or pleats of the filter are located in the flowpath between the inlet port 22 and the outlet port 24. The outlet port 24 may, in use, be connected to a dirt and debris collector (not shown) for collecting the dirt and dust removed from a filter.

In order to secure the filter and provide mechanical agitation to the filter, a filter clamping assembly 40 and a mechanical agitation assembly 50 are provided. The filter clamping assembly 40 is arranged on the cover 16 and is movable therewith as shown in FIG. 4. The filter clamping assembly 40 is operable to secure the upper end of the filter (not shown) such that the filter is held within the cleaning chamber 18 between the filter clamping assembly 40 and the mechanical agitation assembly 50.

Referring now to FIG. 5, the filter clamping assembly 40 will be described in more detail. The filter clamping assembly 40 is operable to secure the upper end of a filter such that, when the filter is vibrated or rotated during the cleaning process, the filter does not move in relation to the cleaning chamber 18, i.e. does not fall over or become lodged. The filter clamping assembly 40 also comprises the inlet port 22 which is formed in a central part thereof to permit a flow of compressed gas to pass into the cleaning chamber 18.

Figure 11:
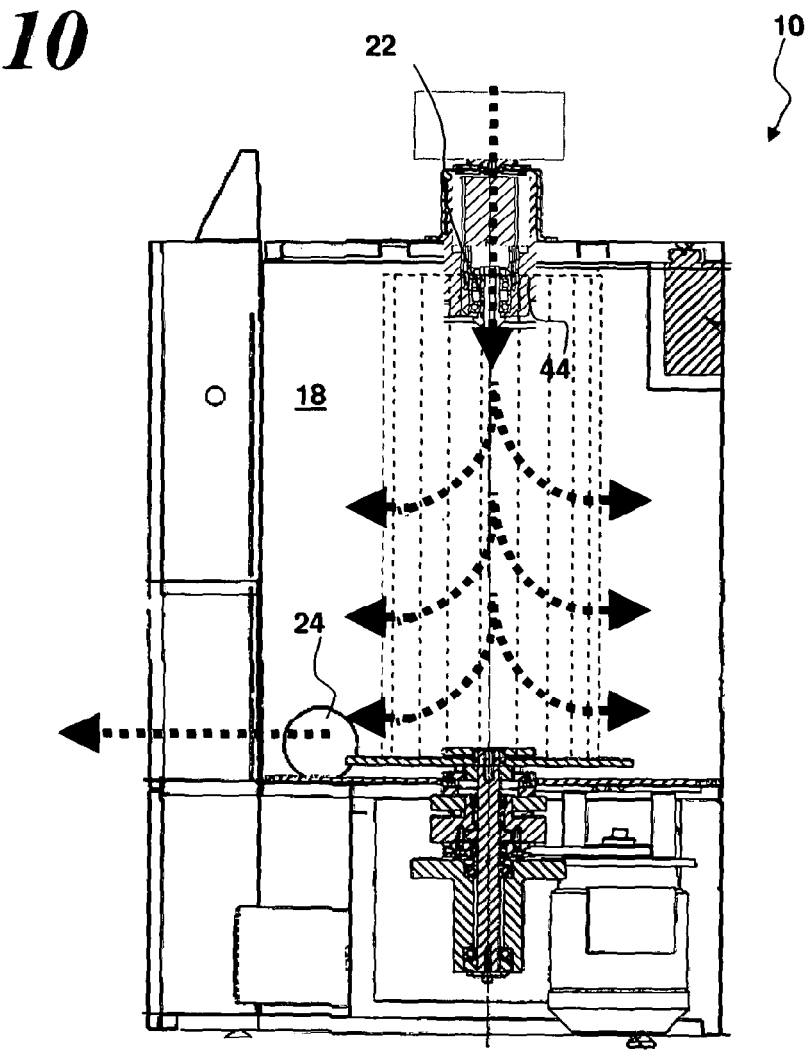
FIG. 11 is a schematic side view of the filter cleaning device similar to FIG. 5 but showing the device in an in-use configuration.

The filter clamping assembly comprises a fixed housing 42 which is secured to the upper surface of the cover 16. Within the fixed housing 42 is a movable unit 44 which is movable downwardly to extend into an open portion of the filter (when located in position) and to prevent movement of the filter. The extended position is shown in FIG. 11. The movable unit 44 is pneumatically powered to extend automatically into the cleaning chamber 18 and ensure that the filter is held securely within the cleaning chamber 18 prior to commencement of the cleaning process.

Alternatively, the movable unit 44 may be powered by other means; for example, an electric motor or manual operation. However, a pneumatic operation is effective because the source of pressurised gas (not shown) which is used to provide a fluid flow through the cleaning chamber 18 can also be used to move the movable unit 44 into an extended position as shown in FIG. 11.

The mechanical agitation assembly 50 is located at the base 26 of the cleaning chamber 18 and is operable to receive a filter (not shown) thereon and to generate oscillations and/or vibrations as will be described later. Particularly with reference to FIG. 5, the mechanical agitation assembly 50 comprises a filter drive arrangement 52 rotatable about an axis X-X, a drive motor 54 for rotatably driving the filter drive arrangement 52 about the axis X-X and a motor speed controller 56 for controlling operation and speed of the motor 54.

The motor 54 may comprise any suitable unit which is capable of bi-directional rotation and has speed varying capacity. Suitable electrical motor types may include an AC motor, a DC induction motor, a brushless motor or any other type. Alternatively, a motor need not be provided and the drive for the filter drive arrangement 52 be obtained from an alternative source or external source such as an IC engine or generator. The motor 54 is connected to the filter drive arrangement 52 by means of a belt drive (not shown). However, other arrangements may be used; for example a chain linkage or a gear assembly.

The motor controller 56 is operable to control the speed and/or direction of the motor 54. The motor controller 56 is operable to issue electronic signals to the motor 54 to control the speed and direction thereof. The motor controller 56 comprises program logic and is operable to drive the motor 54 in accordance with a plurality of pre-programmed routines or cleaning programs. The motor controller 56 may, optionally, comprise a programmable logic controller (PLC) which is further operable to control the electrical and pneumatic sequencing of the operation of the filter cleaning device 10.

Alternatively, the motor controller 56 may be operable manually to set a particular desired rotation speed or direction. The motor controller is operated by means of buttons 58 located on the upper surface of the body 12 of the filter cleaning device 10 as shown in FIG. 1.

Figure 6:
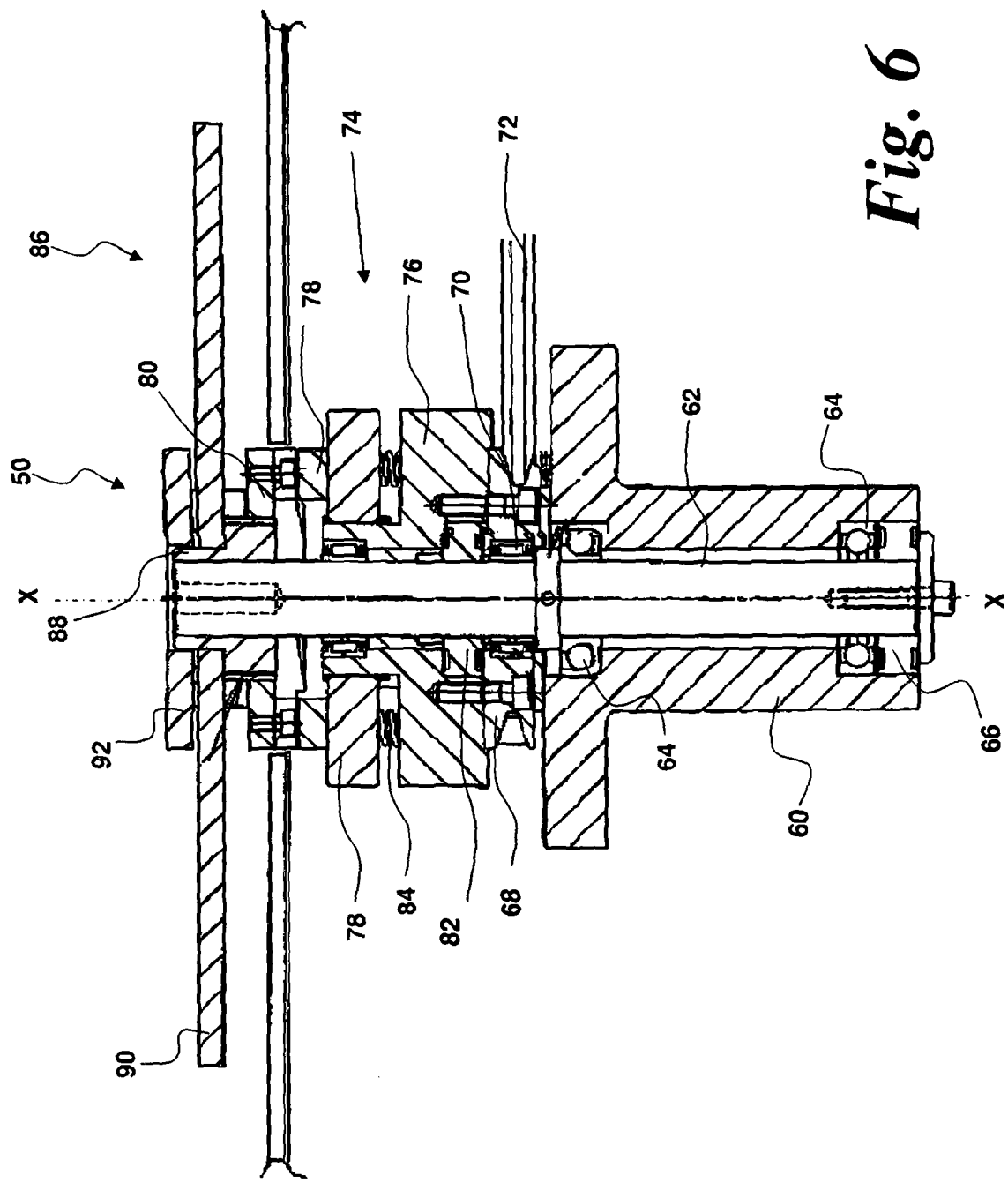
FIG. 6 is a side section of a mechanical agitation assembly forming part of the filter cleaning device of FIGS. 1 to 5.
Figure 7:
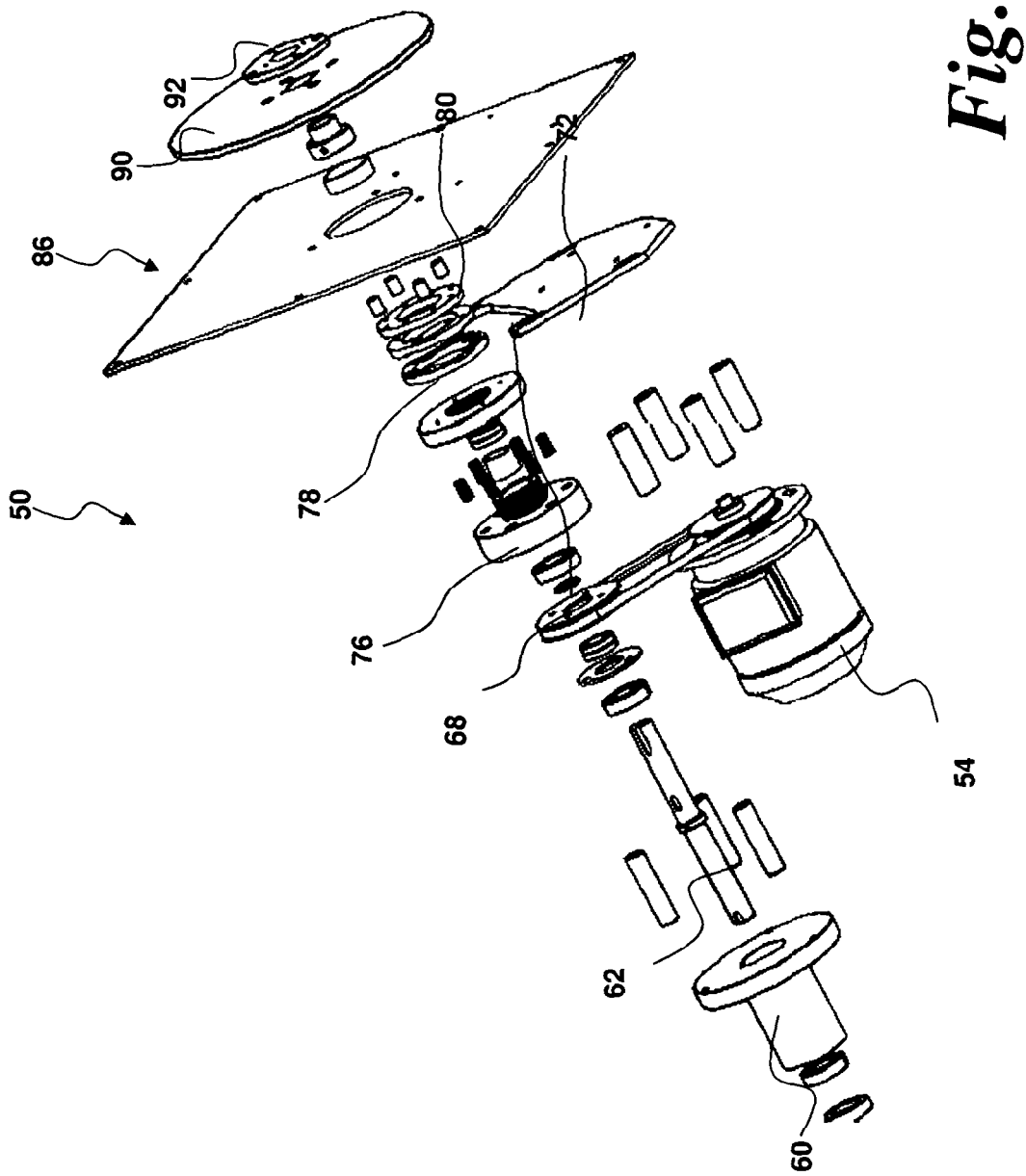
FIG. 7 is an exploded perspective view of the mechanical agitation assembly of FIG. 6.

The filter drive arrangement 52 is shown in more detail in FIGS. 6 and 7. FIG. 6 shows a side section of the filter drive arrangement 52 removed from the remainder of the filter cleaning device 10 and FIG. 7 shows an exploded view of the components of the filter drive arrangement 52.

The filter drive arrangement 52 comprises a drive unit housing 60 which, in use, is held stationary with respect to the base 26 of the cleaning chamber 18. A drive shaft 62 is rotatably mounted within the drive unit housing 60 by means of bearings 64. When located within the interior of the filter cleaning device 10 (as shown in FIG. 5), the drive shaft 60 is rotatable about the axis X-X in at least one mode of operation.

The drive shaft 62 is also connected to the drive unit housing 60 by means of a sprag clutch 66. The sprag clutch 66 (or one-direction freewheel clutch) essentially permits relative movement of the drive shaft 62 with respect to the drive unit housing 60 in one direction of rotation only, with relative movement in the opposite rotational direction causing the drive shaft 62 to become locked with respect to the drive unit housing 60.

In this embodiment, the drive shaft 62 is free to rotate with respect to the drive unit housing 60 in a clockwise direction (as viewed from above the filter cleaning device 10). However, the sprag clutch 66 will not permit relative rotation in the anti-clockwise direction and so, because the drive unit housing 60 is fixed with respect to the cleaning chamber 18 and remainder of the filter cleaning device 10, the drive shaft 62 is held stationary if rotation is attempted in this direction.

A pulley wheel 68 is located about the drive shaft 62 and is rotatably mounted thereon by means of a bearing 70. The pulley wheel 68 is operable to receive a belt 72 (shown best in FIG. 7) to enable the motor 54 to drive the pulley wheel 68.

There is also provided a ratchet drive mechanism 74 for generating axial oscillations in the direction of the axis X-X. In other words, the ratchet drive mechanism 74 is operable to convert the rotational motion of the motor 54 and pulley wheel 68 into linear oscillatory motion in the direction of the axis X-X.

The ratchet mechanism comprises a ratchet drive hub 76, a first ratchet plate 78 and a second ratchet plate 80. The ratchet drive hub 76 is rotatably mounted about the drive shaft 62 and connected thereto by a further sprag clutch 82. The sprag clutch 82 permits rotational motion of the ratchet drive hub 76 with respect to the drive shaft 62 in an anticlockwise direction only (as viewed in plan).

Therefore, when the ratchet drive hub 76 is rotated in an anticlockwise direction, the ratchet drive hub 76 will rotate with respect to the drive shaft 62. However, if it is attempted to rotate the ratchet drive hub 76 in a clockwise direction, the sprag clutch 82 will lock the ratchet drive hub 76 to the drive shaft 62 and the drive shaft 62 and ratchet drive hub 76 will move in unison.

The ratchet drive hub 76 is connected in fixed relation to the pulley wheel 68 and is secured thereto with bolts. Therefore, rotation of the pulley wheel 68 by the motor 54 will cause rotation of the ratchet drive hub 76.

The first ratchet plate 78 is connected to the ratchet drive hub 76 by means of a plurality of axial splines (shown best in FIG. 7) which prevent rotation of the first ratchet plate 78 with respect to the ratchet drive hub 76 but permit axial movement with respect thereto. A plurality of springs 84 are provided between the ratchet drive hub 76 and the first ratchet plate 78 and bias the first ratchet plate 78 away from the ratchet drive hub 76. As shown in FIG. 7, the springs 84 are located in recesses formed in the first ratchet plate 78 and ratchet drive hub 76.

Figure 8:
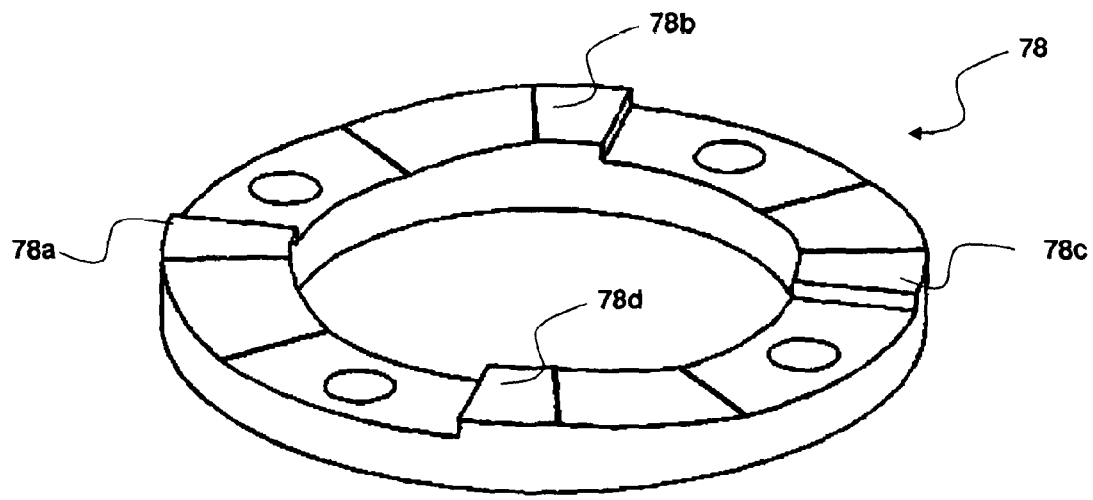
FIG. 8 is a perspective view of a ratchet plate forming part of the mechanical agitation assembly of FIGS. 6 and 7.
Figure 9:
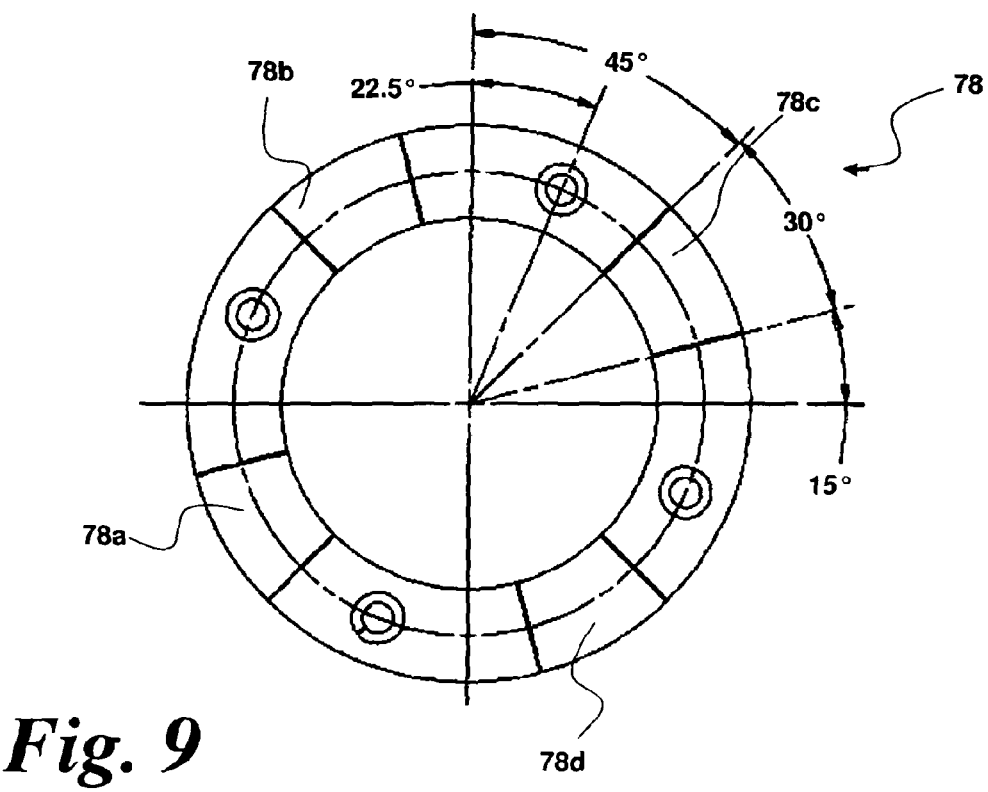
FIG. 9 is a plan view of the ratchet plate of FIG. 8.
Figure 10:
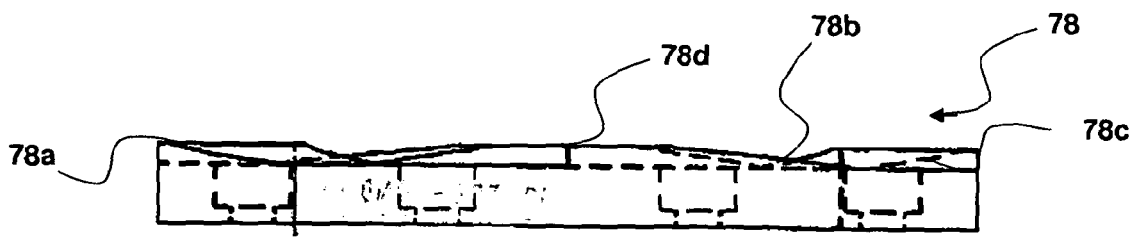
FIG. 10 is a side view of the ratchet plate of FIG. 8.

FIGS. 8 to 10 show the first ratchet plate 78 in more detail. Whilst these figures show the first ratchet plate 78, the second ratchet plate 80 is substantially identical and can be considered to comprise the same features. The upper surface of the first ratchet plate 78 comprises a plurality of ramps or cams 78a-78d. Each cam 78a-78d comprises a ramp surface and a flat upper surface. This profile has been found to provide the most effective oscillation of the filter when inserted.

In this embodiment, four cams 78a-78d are provided circumferentially around the cam surface of the first ratchet plate 78. As shown best in FIG. 9, the ramp surface of each cam 78a-78d has an angular extent of 30° around circumference of the first ratchet plate 78. Concomitantly, the flat upper surface has an angular extent of 15°. Each cam 78a-78d has an angular separation of 45° so that each 90° quadrant comprises a single cam 78a-78d. In other words, the four cams 78a-78d are equi-spaced about the axis of rotation of the first ratchet plate 78.

The second ratchet plate 80 also comprises a plurality of complementary cams 80a-80d on a cam surface thereof. As for the first ratchet plate 78, four cams 80a-80d are provided in this embodiment. The cams 80a-80d correspond to the cams 78a-78d shown in FIG. 9 and comprise a ramp surface of each cam 80a-80d having an angular extent of 30° around circumference of the second ratchet plate 80. Concomitantly, the flat upper surface of each cam 80a-80d has an angular extent of 15°. Each cam 80a-80d has an angular separation of 45° so that each 90° quadrant comprises a single cam 80a-80d. As for the first ratchet plate 78, the four cams 80a-80d are equi-spaced about the axis of rotation of the first ratchet plate 78.

The second ratchet plate 80 is operable to engage with the first ratchet plate 78 in opposed relation such that the cams 80a-80d of the second ratchet plate 80 face and engage with the cams 78a-78d of the first ratchet plate 78. The second ratchet plate 80 is fixedly connected to a filter support arrangement 86.

When assembled, the springs 84 bias the first ratchet plate 78 towards the second ratchet plate 80 such that the cams 78a-78d of the first ratchet plate 78 engage with the cams 80a-80d of the second ratchet plate 80.

The filter support arrangement 86 is fixedly connected in fixed relation to the drive shaft 62 and comprises a filter drive mount plate 88, a filter drive plate 90 and an upper vibration plate 92. Each of the filter drive mount plate 88, a filter drive plate 90 and an upper vibration plate 92 is fixedly connected to the drive shaft 62 and rotate in unison therewith.

The second ratchet plate 80 is fixedly connected to the filter drive mount plate 88 and secured with a bronze bush to reduce wear. The filter drive mount plate 88 is, in turn, secured to the drive shaft 62 by means of a groove and pin arrangement.

The filter drive plate 90 is dimensioned and arranged to receive a filter thereon and comprises an essentially planar circular metallic plate. The upper vibration plate 92 is secured to an upper surface of the filter drive plate 90 and ensures that the upper vibration plate 92 is securely connected to the drive shaft 62 and rotatable therewith.

In use, the cover 16 is opened by a user and a filter is placed on to the circular filter drive plate 90. If desired, a suitable adaptor may be connected to the top of the filter to enable use in the machine or to enable cleaning of different sized filters. The user then closes the cover 16. The machine is started by a user pressing a button 58 on the outer body 12 of the filter cleaning device 10. The automatic locking mechanism 16a is then activated to prevent the cover 16 from being lifted by a user or from coming open during use.

The movable unit 44 is then extended into the cleaning chamber 18 by pneumatic means. The movable unit 44 travels down into the extended position (as shown in FIG. 11) to hold the filter in a central position and creates an air-tight seal on the top and bottom of the filter. It then goes through an automatic cleaning cycle comprising two modes of operation as will be described below.

The filter cleaning device 10 is operable in two modes of operation. In a first mode of operation it is desired to generate only oscillatory longitudinal motion along the axis X-X to vibrate a filter located on the filter drive plate 90. In other words, it is desired to vibrate the filter in a vertical direction to loosen dirt and dust attached thereto. This mode of operation, thus, shakes or vibrates the filter for a predetermined period of time in order to loosen dirt and dust collected in the veins of the filter.

However, in a second mode of operation, it is desired to rotate the filter drive plate 90 (and thus the filter attached thereto) without any vibration or longitudinal oscillatory motion of the filter drive plate 90. The filter is thus rotated at high speed to create sufficient centrifugal force to force dirt and dust out of the veins of the filter. As will be described, this is also accompanied by a pressurised airflow passing from the inlet port 20 to the outlet port 22 via the interior of the filter to assist in forcing the accumulated dirt and dust from the filter veins.

In the first mode of operation, the motor 54 is operable to rotate in an anti-clockwise direction (as viewed from above). Via the pulley belt 72, the pulley wheel 68 is also rotated in an anti-clockwise direction. Since the pulley wheel 68 is fixedly connected to the ratchet drive hub 76, the ratchet drive hub 76 will be rotated in an anti-clockwise direction with respect to the drive shaft 62. Since this is the free movement direction of the sprag clutch 82, the ratchet drive hub 76 will move independently of the drive shaft 62. Furthermore, the drive shaft 62 is prevented from moving with the ratchet drive hub 76 due to the sprag clutch 66 which prevents anti-clockwise motion of the drive shaft 62 with respect to the drive unit housing 60.

Therefore, in this mode of operation, the drive shaft 62 is locked with respect to the drive unit housing 60 and is, consequently, kept stationary with respect to the cleaning chamber 18. As a result, the filter drive plate 90 (which is fixedly connected to the drive shaft 62) does not rotate in this mode of operation.

However, as mentioned above, the ratchet drive hub 76 is free to rotate in an anti-clockwise direction with respect to the drive shaft and with respect to the cleaning chamber 18.

Rotation of the ratchet drive hub 76 will also cause the first ratchet plate 78 to be rotated. However, the second ratchet plate 80 is kept stationary due to the fixed orientation of the drive shaft 62 to which it is (indirectly) connected. Therefore, the first ratchet plate 78 will rotate with respect to the second ratchet plate 80. Since the springs 84 bias the first ratchet plate 78 towards to the second ratchet plate 80, the cams 78a-78d of the first ratchet plate 78 will engage with the cams 80a-80d of the second ratchet plate 80.

Due to the saw-tooth profile of the cams 78a-78d, 80a-80d, the second ratchet plate 80 will be biased upwardly by the first ratchet plate 78 as the cams 78a-78d, 80a-80d engage with one another. The second ratchet plate 80 will then fall as the cams 80a-80d pass over the raised ends of the corresponding cams 78a-78d. This motion will cause the filter drive plate 90 to raise and lower as the cams 78a-78d, 80a-80d engage with one another, resulting in oscillatory linear reciprocating motion of the filter drive plate 90 in the direction of the axis X-X.

In this embodiment, the rotational drive speed of the pulley wheel 68 is selected to be 250 rpm. Therefore, given that there are four cams 78a-78d, 80a-80d per ratchet drive plate 78, 80, this will result in 1000 oscillations per minute. This has been found by the inventors to provide a good balance between loosening dirt and dust from the filter and preventing damage to the filter. This mode is typically run for about 30 seconds.

In the second mode of operation, the motor 54 is driven in a clockwise direction. Via the pulley belt 72, the pulley wheel 68 is also rotated in clockwise direction. Since the pulley wheel 68 is fixedly connected to the ratchet drive hub 76, the ratchet drive hub 76 will be rotated in a clockwise direction. In this direction of motion, the sprag clutch 82 will be locked and will prevent rotational motion between the drive shaft 62 and the ratchet drive hub 76. Therefore, in this mode of operation, the ratchet drive hub 76 is effectively locked to the drive shaft 62 and rotation of the ratchet drive hub 76 in a clockwise direction will cause the drive shaft 62 to be rotated in a clockwise direction also.

Since clockwise rotation of the drive shaft 62 with respect to the drive unit housing 60 is permitted by the sprag clutch 66 (because this is the free movement direction of the sprag clutch 66), rotation of the pulley 68 will cause the drive shaft 62 to rotate in unison therewith relative to the drive unit housing 60.

As described above, the filter support arrangement 86 is fixedly connected to the drive shaft 62. Therefore, the filter drive mount plate 88, the filter drive plate 90 and the upper vibration plate 92 will all rotate in unison with the drive shaft 62. Additionally, because the second ratchet plate 80 is fixedly connected to the filter support arrangement 86, this will rotate in unison therewith.

Consequently, in this mode of operation, there is no relative rotational motion between the first and second ratchet drive plates 78, 80 and there plates 78, 80 rotate together. As a result, in this mode of operation, the filter drive plate 90 (and thus a filter located thereon) will be rotated in a clockwise direction (as viewed from above). Further, there will be no longitudinal oscillations or vibrations because the first and second ratchet drive plates 78, 80 are rotating together.

In this embodiment, the drive shaft 62 (and, thus the filter drive plate 90) is rotated at 900 rpm. This rotational speed has been found to provide sufficient centrifugal force to cause dirt and dust loosened from the filter in the first mode of operation to be removed from the filter and to pass out of the outlet port 24.

To aid the dirt and dust removal process, a high volume of pressurised gas flow is introduced into the cleaning chamber 18 through the inlet port 22. In this embodiment, compressed air is used, although any suitable gas under pressure could be used. In this embodiment, air at a pressure of 6 bar is used. This provides a flow rate through the inlet port 22 of 100 CFM (approximately 2833 liters/minute).

The inlet port 22 extends through the movable unit 44 and, when in use, the movable unit 44 extends into the central portion of an inserted filter. Therefore, the airflow is admitted to the interior of the cleaning chamber into the interior of the inserted filter. Since the cleaning chamber is sealed, the only outlet for the airflow is through the outlet port 24 which is located outwardly of the filter. Therefore, the airflow is forced to flow from the inlet port 22, through the filter medium itself and the veins of the filter medium to the outlet 24 to assist in dislodging accumulated dirt and dust from the filter medium.

In order to improve the cleaning of the filter, the pressurised airflow can be pulsed to cause flexure of the veins of the filter medium and to help break up the dirt and dust. In this embodiment, the airflow is pulsed at 5 second intervals (i.e. 5 seconds on, 5 seconds off) which causes the filter veins to flex, breaking up the accumulated dirt and dust. In this embodiment, the second mode of operation lasts for 3 minutes.

Dirt and dust removed from the filter is drawn by the airflow out of the cleaning chamber 18 and into a suitable collector (not shown) for disposal.

Variations of the above embodiments will be apparent to the skilled person. The precise configuration of components may differ and still fall within the scope of the present disclosure.

For example, whilst air filters of the pleated type have been discussed and illustrated, the filter cleaning device may be operable to clean any suitable type of air filter. Non-exhaustive examples may comprise vehicle air filters (such as for cars, trucks, trains or helicopters) filters for drilling and/or mining equipment, vacuum cleaner filters or other uses. The filters need not be pleated and may comprise any suitable filter medium which can be cleaned through the application of a pressurised gas flow and through mechanical vibration.

Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

The invention claimed:

1. A filter cleaning device comprising a cleaning chamber operable to receive a gas filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement arranged to contact at least a part of the filter when inserted and operable in a first mode of operation, to generate only a linear oscillation along an axis of the filter when inserted and, in a second mode of operation, to rotate the filter about an axis of rotation without linear oscillation along the axis of the filter, wherein in the second mode of operation a gas flow is admitted into the cleaning chamber and forced to flow through at least a part of the filter to the outlet.

2. A filter cleaning device according to claim 1, wherein the linear oscillation is generated along the same axis as the axis of rotation about which the filter is rotatable.

3. A filter cleaning device according to claim 1, wherein the mechanical agitation arrangement comprises a receiving surface operable to receive the filter thereon.

4. A filter cleaning device according to claim 3, wherein the receiving surface is operable, in the first mode of operation, to oscillate along an axis of the filter and, in a second mode of operation, to rotate about the axis of rotation.

5. A filter cleaning device according to claim 4, wherein the receiving surface comprises a plate located at a base of the cleaning chamber.

6. A filter cleaning device according to claim 3, wherein the mechanical agitation arrangement comprises two opposing cam plates, at least one cam plate comprising at least one cam thereon, wherein in the first mode of operation one of the cam plates is operable to rotate with respect to the other of the cam plates.

7. A filter cleaning device according to claim 6, wherein, in the second mode of operation the cam plates remain stationary with respect to one another.

8. A filter cleaning device according to claim 6, wherein each cam plate comprises a plurality of cams.

9. A filter cleaning device according to claim 8, wherein each cam plate comprises four cams.

10. A filter cleaning device according to claim 6, wherein one of said cam plates is fixedly connected to the receiving surface.

11. A filter cleaning device according to claim 1, wherein the mechanical agitation arrangement further comprises an electrical drive motor.

12. A filter cleaning device according to claim 1, wherein a clamp arrangement is provided to secure the filter within the cleaning chamber.

13. A filter cleaning device according to claim 12, further comprising an openable cover to provide access to the cleaning chamber, the clamp being located on the cover.

14. A filter cleaning device according to claim 1, wherein the filter is an air filter.

15. A method of using the filter cleaning device of claim 1 to clean a gas filter.

16. A method of cleaning a gas filter using a filter cleaning device comprising a cleaning chamber operable to receive a gas filter to be cleaned, the cleaning chamber having an inlet through which a gas flow can be admitted and an outlet for gas flow leaving the cleaning chamber, the inlet and outlet being arranged such that the airflow is forced to pass through at least a part of the filter when inserted, the filter cleaning device further comprising a mechanical agitation arrangement arranged to contact at least a part of the filter when inserted and the method comprising:
   a) generating only a linear oscillation of the filter along an axis of the filter when inserted to agitate the filter for a first period of time;
   b) passing a gas flow through the filter; and
   c) rotating the filter, without linear oscillation along the axis of the filter, for a second period of time.

17. A method according to claim 16, wherein steps b) and c) are carried out at the same time.

18. A method according to claim 17, wherein said second period of time is greater than said first period of time.

* * * * *